United States Patent [19]
Higurashi et al.

[11] Patent Number: 6,084,737
[45] Date of Patent: Jul. 4, 2000

[54] MAGNETIC PLAYBACK SYSTEM

[75] Inventors: Seiji Higurashi; Yoichi Zenno, both of Tokyo, Japan

[73] Assignee: Victor Company of Japan, Ltd., Yokohama, Japan

[21] Appl. No.: 08/966,254

[22] Filed: Nov. 7, 1997

[30] Foreign Application Priority Data

Nov. 7, 1996 [JP] Japan ................................. 8-295563

[51] Int. Cl.$^7$ ................................................ G11B 15/46
[52] U.S. Cl. ...................... 360/73.08; 360/74.1; 360/65
[58] Field of Search ........................... 360/73.08, 73.05, 360/74.1, 75, 77.02, 77.06, 77.11, 77.12, 77.13, 77.16, 65, 64, 51, 39

[56] References Cited

U.S. PATENT DOCUMENTS

| | | | |
|---|---|---|---|
| 4,600,952 | 7/1986 | Igata et al. ........................ | 369/64 X |
| 4,757,408 | 7/1988 | Umeda ............................. | 369/64 |
| 5,341,248 | 8/1994 | Amada et al. .................... | 369/64 X |

*Primary Examiner*—Muhammad Edun
*Attorney, Agent, or Firm*—Michael N. Meller; Eugene Lieberstein

[57] ABSTRACT

A magnetic playback system wherein, during high-speed playback, the speed of rotation of a drum motor is controlled so that the data rate of the playback signal from that one of two rotary heads for which the scanned area on the magnetic tape from which a playback signal can be obtained is larger, will be equal to the data rate of the recorded digital data signal. This drum motor speed control is effected by a speed control servo loop that includes a frequency detector which controls the speed control servo loop based on a speed detection signal and a speed information voltage generated by a speed information voltage generator. The speed information voltage generator generates this speed information voltage based on a control signal played back from the tape by a control head and a tape direction signal.

15 Claims, 12 Drawing Sheets

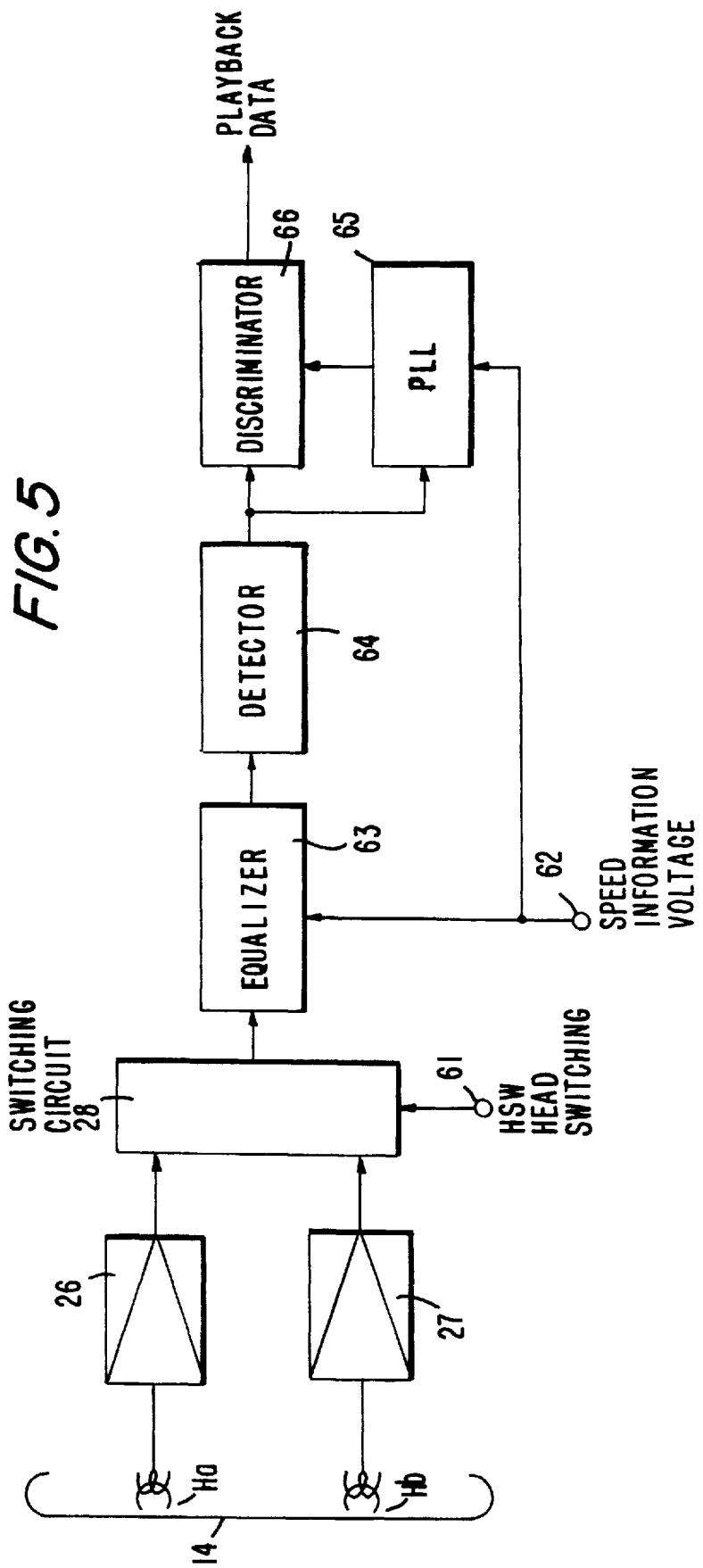

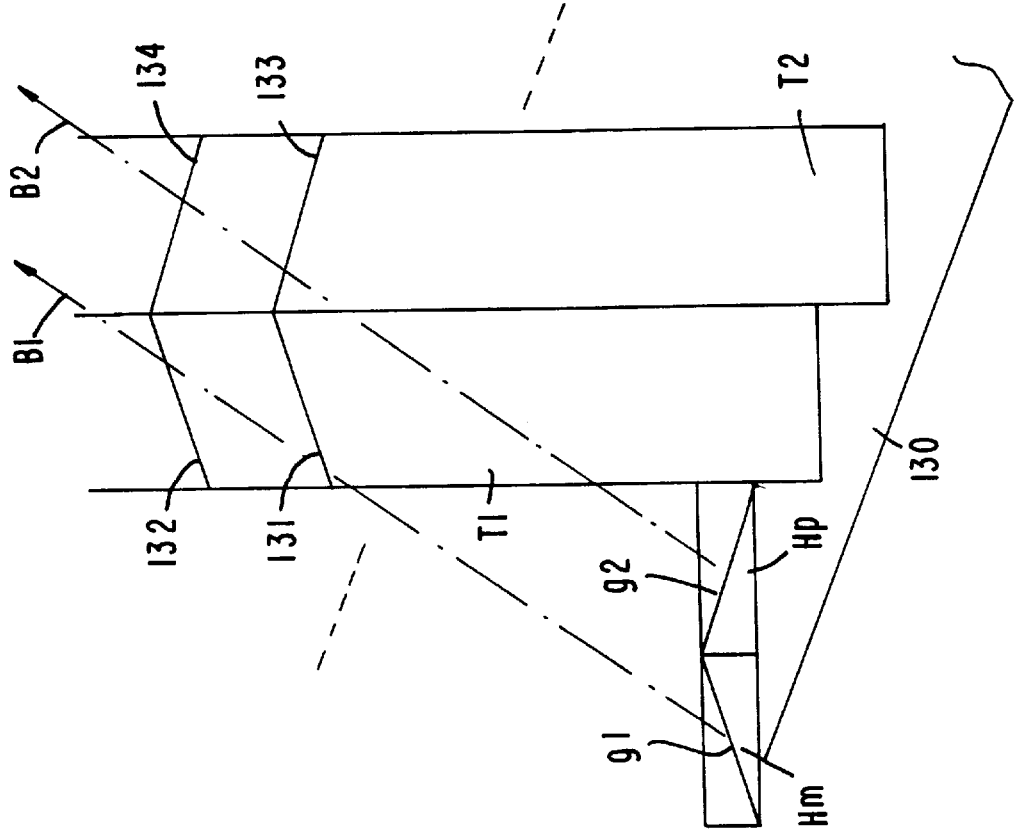
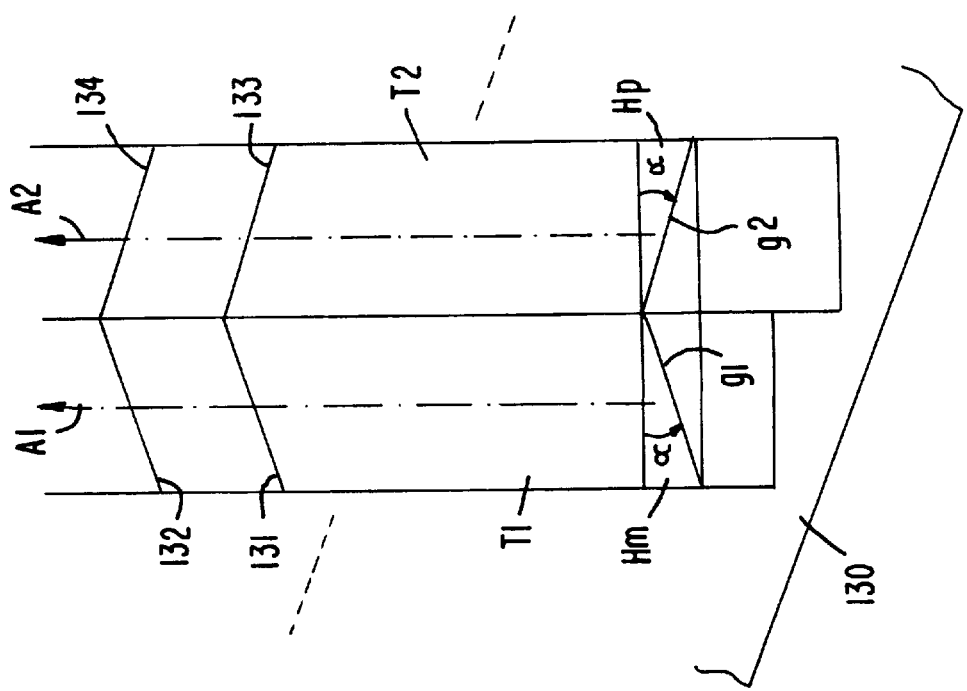

MAGNETIC PLAYBACK SYSTEM

FIELD OF THE INVENTION

The present invention relates to a magnetic playback system. More particularly, the present invention relates to a magnetic playback system that uses a rotary head to perform high-speed playback of a recorded digital data signal from a magnetic tape on which the digital data signal was recorded. The tape speed at playback differs from that at which the tape was recorded.

BACKGROUND OF THE INVENTION

Helical scan-type magnetic recording and playback systems for recording and playback of data signals on magnetic tape are well known. In these conventional systems, data signals are recorded on magnetic tape traveling at a specific speed. The tape is wrapped at an angle around an approximately 180-degree span of the surface of the outer circumference of a rotating cylindrical body. The recording and playback is performed by two rotary heads positioned 180 degrees apart on opposite sides of the rotating body. Normally, to increase the recording density in these conventional magnetic recording and playback systems, the two heads are set at different azimuth angles to permit the recording of more closely spaced data signal tracks on the magnetic tape, with either no guard bands, or very narrow bands, between tracks.

FIGS. 15(A) and 15(B) show enlarged views of portions of these recorded tracks and of the paths scanned by the rotary heads during normal playback, and during other-than-normal playback. As shown in FIGS. 15(A) and 15(B), on a magnetic tape 130, two tracks, T1 and T2, are recorded adjacent to each other, at an angle with respect to the longitudinal direction of the tape, with no guard band between them. Track T1 is formed as it is recorded by a rotary head Hm, with a portion of the magnetization reversals of the recorded signal positioned as indicated at 131 and 132. Track T2 is formed as it is recorded by a rotary head Hp, with a portion of the magnetization reversals of the recorded signal positioned as indicated at 133 and 134. The positions of the magnetization reversals shown at 131 and 132 indicate the recording wavelength. Similarly, the positions of the magnetization reversals shown at 133 and 134 indicate the recording wavelength.

Rotary heads Hm and Hp are magnetic heads that have gaps g1 and g2, respectively, positioned at an angle $\alpha$ with respect to the width direction of the track. In other words, rotating heads Hm and Hp are the same in that they both have the same azimuth angle of $\alpha$ degrees, but differ in that gap g1 is rotated away from the width direction of the track in a counterclockwise direction by an angle of $\alpha$ degrees, while gap g2 is rotated away from the width direction of the track in a clockwise direction by an angle of $\alpha$ degrees, the angle $\alpha$ being an acute angle of less than 90 degrees. For the purposes of this specification, the rotary head Hm having its gap g1 rotated in a counterclockwise direction away from the width direction of the track, shall be defined as a rotary head having a "minus" azimuth angle $\alpha$ ($-\alpha$ degrees). Similarly, the other rotary head Hp having a gap g2 rotated in a clockwise direction away from the width direction of the track shall be defined as a rotary head having a "plus" azimuth angle $\alpha$ ($+\alpha$ degrees).

During normal playback, rotary heads Hm and Hp reproduce signals from tracks T1 and T2 recorded either by these heads themselves, or by heads having the same azimuth angle, on a magnetic tape 130 traveling at the same speed as that at which it is being played back. Therefore, the scan paths of rotary heads Hm and Hp, as indicated by the dotted lines A1 and A2, respectively in FIG. 15(A), will be the same as the recorded paths of tracks T1 and T2. Accordingly, if the magnetization reversal intervals (record wavelengths) in tracks T1 and T2 are the same, the magnetization reversal interval (record wavelength) scan times for the two tracks will also be the same. Also, if the recorded data signal is a digital data signal, the data rates of the playback data from both tracks will be the same, regardless of the azimuth angle.

During special high-speed playback modes, however, rotary heads Hm and Hp reproduce signals from tracks T1 and T2 recorded either by these heads themselves, or by heads having the same azimuth angle, on a magnetic tape 130 traveling at a different speed from that at which it is being played back. Therefore, the scan paths of rotary heads Hm and Hp, as indicated by the dotted lines B1 and B2, respectively in FIG. 15(B), will be different from the recorded paths of tracks T1 and T2.

As can be seen in FIG. 15(B), the tracks are the same width, and the magnetization reversal interval (record wavelength) between track T1 magnetization reversal positions 131 and 132 is the same as that between track T2 magnetization reversal positions 134 and 135. However, the magnetization intervals at 131 through 134 have a slant angle, relative to the width of the tape, corresponding to that of the record rotary head gap. Therefore, when rotary heads Hm and Hp scan along paths B1 and B2, it will take rotary head Hm more time to scan through the magnetization reversal interval of track T1 than it takes rotary head Hp to scan through the magnetization reversal interval of track T2. Accordingly, when the recorded data signal is a digital signal, the data rate of the signal played back through head Hm will be lower than that played back through head Hp.

In VHS®-type VCRs, the rotary heads have an azimuth angle of only ±6 degrees. In 8-mm video, where 8-mm-wide magnetic tape is used to record and playback the data, the rotary head azimuth angle is ±10 degrees. Even in rotary head-type digital audiotape recorders (R-DAT) for recording and playing back digital audio signals, the rotary head azimuth angle is only ±20 degrees. Also, the tape speed in special playback modes in these systems is not that much greater than that in normal modes. For all practical purposes, then, for the above reasons, in these prior systems, it was possible to ignore the difference in playback times for heads Hm and Hp for the same magnetization reversal (record wavelength), due to the different azimuth angle during special high-speed playback modes, as described above. In other words, in the past, no corrective action was required.

In recent years, however, there has been a large amount of research in this area. New digital recorders, for example, have been developed for recording and playing back bit streams of digital data compressed in accordance with the MPEG format. Although these new recorders still use the same basic helical scan magnetic recording and playback system as that described above, they now use a larger rotary head azimuth angle of 30 degrees. Furthermore, they also use a playback tape speed that may be one hundred times greater than the speed at which the data was recorded. Therefore, this problem has now become large enough that it is no longer possible to ignore the difference in the data rates of the playback signals obtained from the two rotary heads due to the fact that they have different playback times for the same magnetization reversal which, as described above, is due to the change in the azimuth angle that occurs when the system goes to the special high-speed mode. There is now a problem then, in that it is no longer possible to efficiently reproduce playback data from the tape at high tape speeds in currently available systems.

The apparatus incorporating the principles of the present invention was conceived with the above problem in mind. It is an object of the present invention to provide a magnetic playback system capable of reproducing playback data with good efficiency.

It is a further object of the present invention to provide a magnetic playback system that can perform accurate playback of high-speed playback data in a low-cost configuration.

SUMMARY OF THE INVENTION

Accordingly, it is an object of the present invention to overcome the problems developed in prior art solutions.

In a preferred embodiment of the present invention, a magnetic playback system is provided for playing back pre-recorded signals from a magnetic tape. The signals are digital signals recorded, at a first speed and a first data rate, in adjacent slant tracks on the tape alternating between first and second azimuth angles. The tape also has a control signal recorded thereon. The system includes a rotatable member arranged adjacent the magnetic tape, the member having first and second magnetic playback heads fixedly mounted thereon. The first head is mounted at the first azimuth angle and the second head is mounted at the second azimuth angle with respect to the tape. Also included are means for rotating the rotatable member to generate, respectively, a first and a second playback signal at a playback speed faster than the first speed from the first and second playback heads, as the tape is moved past the playback heads. Means responsive to the control signal recorded on the tape are provided for generating speed information voltage for making the data rate of a selected one of the first and second playback signals equal to the first data rate. Finally, control means are included for controlling the speed of rotation of the rotatable member in response to the speed information voltage.

In a further preferred embodiment, the speed information voltage generating means selects the first or second playback signal based on the direction of travel of the tape as determined by the control signal.

In another embodiment, the means for rotating the rotatable member is a motor and the control means for controlling the speed of the motor is a speed control servo loop.

A preferred embodiment of the speed information generating means includes counting means for producing a count signal corresponding to the travel speed of the tape based on the control signal. Also included is a memory having data stored therein and responsive to the count signal and to a tape direction signal from the control signal for making the data rate of a selected one of the playback signals equal to the first data rate. Finally, a D/A converter is included, coupled to the memory for converting the data output of the memory to produce the speed information voltage.

The speed information voltage generator in a preferred embodiment generates speed information voltage such that when the tape direction during high-speed playback is the same as the tape direction when the magnetic tape was recorded, the data rate of the playback signal of the second rotary head is equal to the data rate of the recorded digital data signal. When the tape direction during high-speed playback is the reverse of the tape direction when the magnetic tape was recorded, the data rate of the playback signal of the first rotary head is equal to the data rate of the recorded digital data signal.

During high-speed playback, in order to enable a signal to be obtained from a prescribed one of the rotary heads, as determined according to the direction of travel of the magnetic tape, the data rate of the playback signal from that prescribed one of the rotary heads is made equal to the data rate of the recorded digital data signal. In this regard, when the tape direction at playback is the same as it was when the signal was recorded, the second rotary head is the "prescribed one" of the first and second rotary heads. When the tape direction at playback is the reverse of the direction when the signal was recorded, the first rotary head is the "prescribed one" of the first and second rotary heads.

In an embodiment of the present invention, even when there is a difference in the data rates of the playback signals of the first and second rotary heads due to the difference in their respective azimuth angles during high-speed playback clock signals can be extracted from the playback signals of both the first and second rotary heads using a single phase-locked loop.

Also, during high-speed playback, the equalization characteristics of an equalizer are set to equalization characteristics adapted to the data rates of the playback signals of the first and second rotary heads, based on setting voltages output by a setting voltage generator. By synchronizing these settings with a head-switching pulse signal, equalization characteristics can be applied for both the first and second rotary heads using a single equalizer.

A speed control servo loop can be utilized for controlling the drum motor speed in a manner such that during high-speed playback, the data rate of the playback signal of either the first or the second rotary head will be higher than it is during normal playback, while the data rate of the playback signal of the other rotary head is lower than it is during normal playback. This reduces the size of the changes required to be made in the center frequency of the voltage-controlled oscillator in the phase-locked loop, and in the equalization characteristic of the equalizer by synchronously switching their settings with the head-switching pulse.

BRIEF DESCRIPTION OF THE DRAWINGS

The above and other objects, features, and advantages of the present invention will become more apparent from the following detailed description taken with the accompanying drawings, in which:

FIG. 4, including

FIG. 5 is a block diagram of a second embodiment of the present invention;

FIG. 15 shows rotary head scan paths during normal playback and other than normal playback.

DESCRIPTION OF THE PREFERRED EMBODIMENTS

Figure 1:
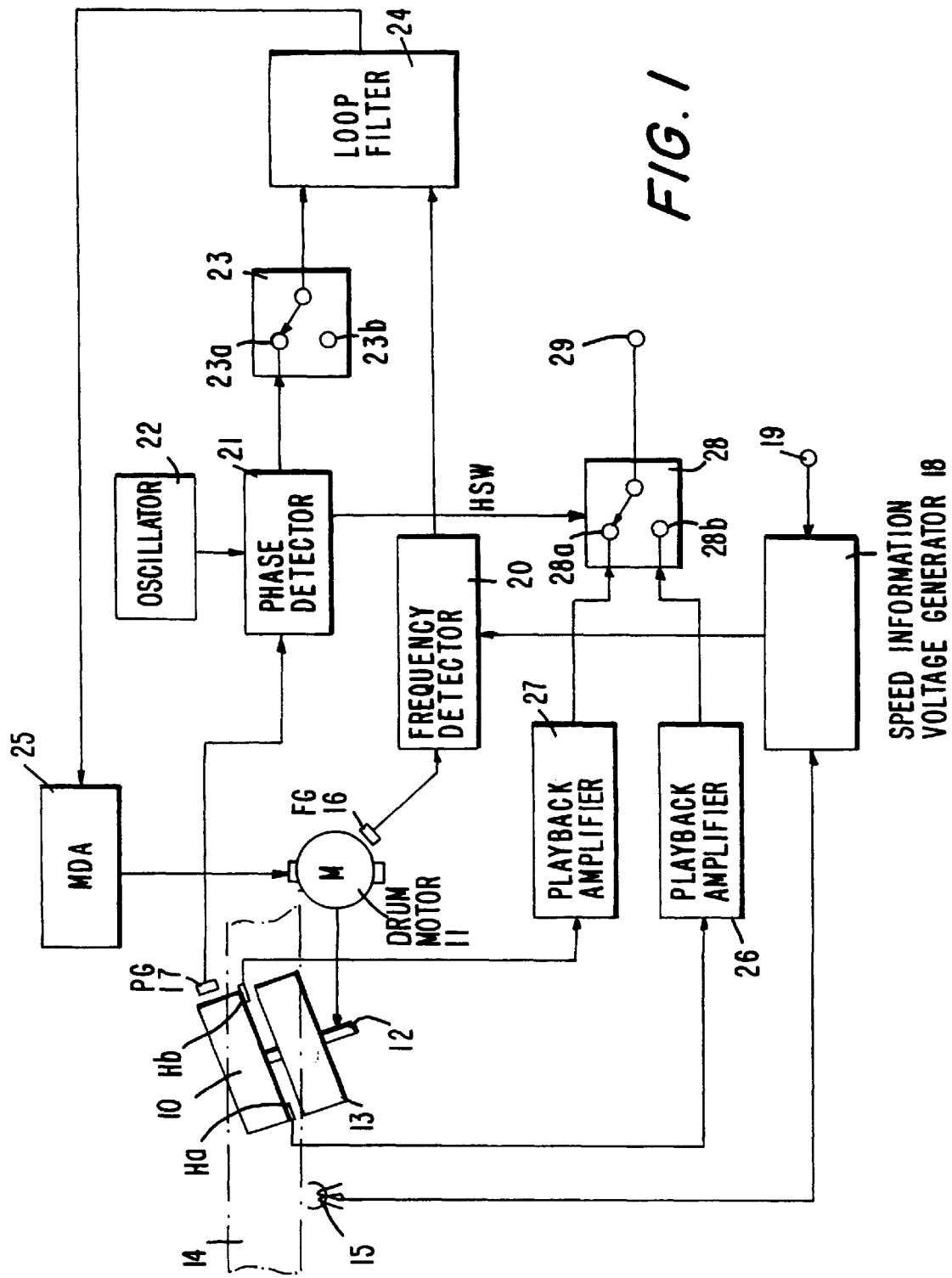
FIG. 1 is a block diagram of a first embodiment of the present invention.

Referring to the drawings, FIG. 1 is a block diagram showing the configuration of a first embodiment of the magnetic playback system incorporating the principles of the present invention. As shown in this drawing, attached to the bottom surface of a cylindrical rotary drum 10 are two rotary heads, Ha and Hb. The heads Ha and Hb are installed in diametrically opposite positions, and at the same height at azimuth angles of −30 and +30 degrees, respectively, such that the gap surfaces of the heads protrude slightly above (outward of) the circumference of the rotary drum 10.

The end of a motor shaft 12 of a drum motor 11 passes through the center of a stationary cylindrical drum 13 that is provided below, and separated slightly from the rotary drum 10. The end of the shaft 12 is attached to the center of the rotary drum 10. Thus the rotary drum 10 and rotary heads Ha and Hb spin as one unit with motor shaft 12 of the motor 11. For convenience, rotation of the motor shaft 12 will also be referred to as rotation of the motor 11.

A magnetic tape 14, indicated by a dash-dotted line in FIG. 1, is wrapped at an angle around an approximately 180-degree span of the surface of the outer circumference of the rotary and stationary drums 10 and 13. The magnetic tape 14 is driven and travels in a given path and direction by a capstan and rollers in a conventional manner but is not shown in the drawing in order to avoid unnecessarily complicating the drawing.

In this embodiment, the magnetic tape 14 is a pre-recorded tape on which a digital data signal has been recorded in slant tracks, with no guard bands, by a first rotary head having an azimuth angle of −30 degrees and a second rotary head at an azimuth angle of +30 degrees. Also recorded on this tape 14 are control pulses (hereinafter called CTL pulses) having a specific pulse repetition rate. This control pulse signal is recorded in a control track that runs along the length of tape 14 at its side edge. The digital signals recorded in the above slant tracks are played back by the rotary heads Ha and Hb, while the CTL pulses of the control track are played back by a stationary control head (hereinafter CTL head) 15.

This digital data signal might consist, for example, of main data, and auxiliary data (referred to as a "packet"). A packet is a data unit of fixed length containing auxiliary data and identification data to identify the various parts of the auxiliary data. The auxiliary data includes cassette ID, time code, recording date and time, source data (e.g., channel number, program index number when the digital broadcast signal was recorded), and text data (e.g., title and summary of each program).

Figure 13:
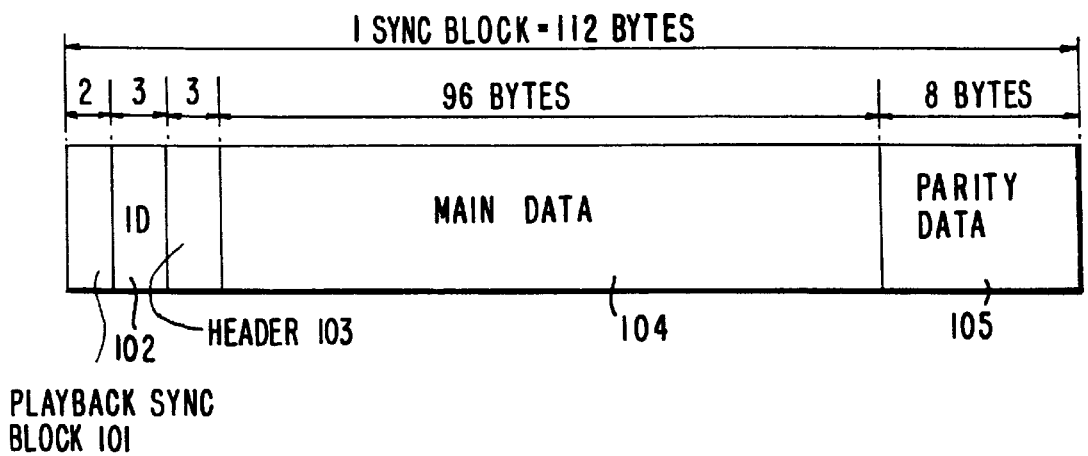
FIG. 13 shows an example of a format of a sync block recorded on magnetic tape.

The packet is recorded, along with the main and subcode data, in each slant track on the magnetic tape 14. Each slant track is formed by recording a string of data areas of a set size, referred to as sync blocks (equivalent to data blocks), as rotary heads Ha and Hb scan the tape. FIG. 13 shows a sample format for such a sync block. As shown in this drawing, one sync block is made up of a total of 112 bytes of data combined in time-series fashion. This 112 bytes of data is recorded in five areas (101 through 105) as follows:

101: Playback sync signal (2 bytes);
102: ID (address data) (3 bytes);
103: Header, containing a variety of data (3 bytes);
104: The actual or main data (96 bytes); and
105: Parity data for sync block error check (8 bytes)

Figure 14:
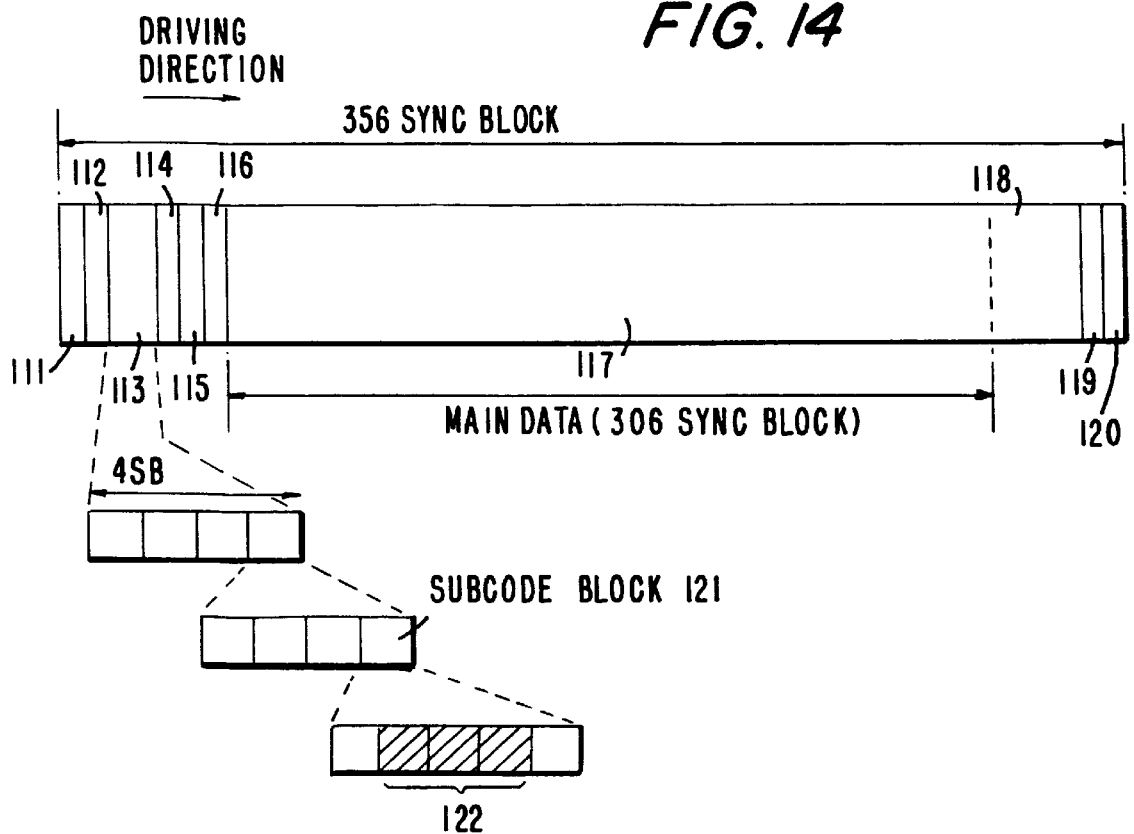
FIG. 14 shows an example of the track format for slant tracks on magnetic tape played back in apparatus incorporating the principles of the present invention.

FIG. 14 shows an example of the track format for the slant tracks on the magnetic tape 14 being played back in this embodiment of the present invention. As shown in this drawing, one track is made up a total of 356 sync blocks divided into 10 areas (111 through 120), as follows:

111: Margin;
112: Preamble;
113: Subcode;
114: Postamble;
115: IBG;
116: Preamble;
117: Main data;
118: Error correction code;
119: Postamble; and
120: Margin.

In this embodiment, within the combined size of the main data area 117 and error correction code area 118, the number of blocks in main data area 117 is set to be a multiple of 6 sync blocks. In this example, it is set to 306 (51×6) sync blocks. External code for error correction purposes (C2 code), is recorded in the error correction code area 118, which contains 30 sync blocks. Subcode area 113 is made up of 4 sync blocks (448 bytes) each of which is in turn made up of 4 subcode blocks 121. Each subcode block 121 contains 3 packets 122. Thus a total of 48 packets (4×4×3 packets) are recorded in one subcode area 113.

One byte of the header area 103 in each of the 306 sync blocks contained in the main data area 117 is allocated to one of the bytes of a packet. One 6-byte packet, then, is recorded within each set of 6 sync blocks. Therefore, 51 packets (306/6) are recorded in the total of 306 bytes in main data area 117. This means that a total of 99 packets are recorded in one track (48 packets in the subcode area 113 +51 packets in the main data area 117).

Returning now to FIG. 1, through a known configuration provided on the motor shaft 12 of drum motor 11, a frequency generator (FG) 16 generates a speed detection signal proportional to the speed of rotation of the drum motor 11. Also provided is a pulse generator (PG) 17 for outputting a phase detection signal that alternates between opposite polarities once each half-turn of rotary drum 10. This pulse generator 17 might be constructed, for example, using two magnets, provided on rotary drum 10 and positioned in a point-symmetrical relationship with respect to the center thereof, and a stationary pickup head that senses the fact the magnets have passed in front of it. The above-described configuration is the same as that of helical scan-type magnetic recording/playback systems known in the past.

Next, operation of this embodiment in the normal playback mode will be described. In normal playback, a capstan (not illustrated) drives the magnetic tape 14 to run in the same direction and at the same speed as when it was used for recording. When this happens, the CTL head 15 plays back CTL pulses from the CTL track of the magnetic tape 14 and supplies them to a speed information voltage generator 18. From this playback CTL pulse signal and a tape direction signal input via a terminal 19, this speed information voltage generator 18 generates a speed information signal that corresponds to the tape speed.

Figure 2:
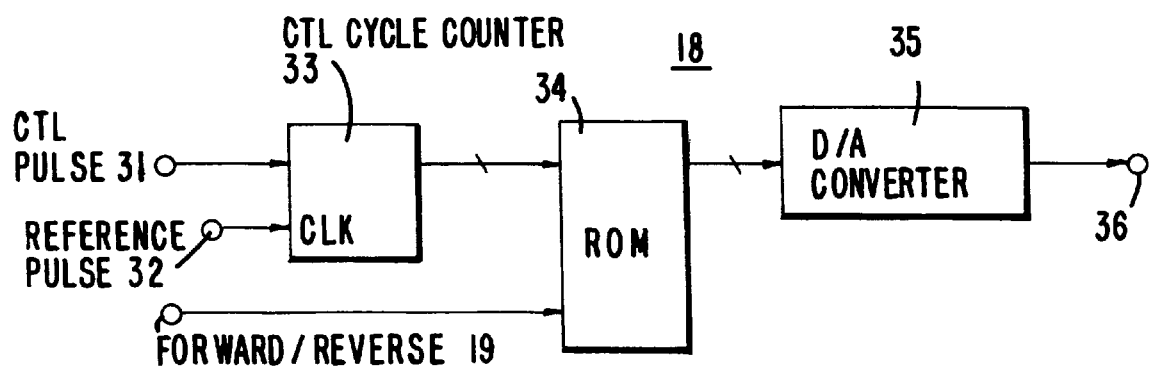
FIG. 2 is a block diagram of a circuit for a speed information voltage generator used in the embodiment of FIG. 1.

FIG. 2 is a block diagram of an example of the type of circuit that could be used for the speed information voltage generator 18 of FIG. 1. As shown in this diagram, the circuit has a CTL cycle counter 33 that receives two inputs: At terminal 31, it receives the above-noted playback CTL pulses, and at terminal 32 it receives a reference pulse signal having a specific pulse repetition frequency (PRF) that is well above that of the playback CTL pulse signal. Based on these two inputs, the CTL cycle counter 33 counts the number of reference pulses that occur during one playback CTL pulse cycle. Thus the count from CTL frequency counter 33 is inversely proportional to the playback CTL pulse frequency. This count is applied to the address terminals of a ROM device (read-only memory) 34 along with the above tape direction signal being applied to terminal 19.

Stored in advance in the ROM device 34 are speed information voltage data corresponding to tape speed and direction. These data are used as drum speed data that will provide the optimum data extraction, as will be described later. The playback CTL pulse frequency is proportional to the tape speed of magnetic tape 14.

To accomplish this, the ROM 34 is provided with two inputs:
the count from the CTL frequency counter 33, indicating the tape speed in normal playback mode, and
the tape direction signal applied to terminal 19, indicating that the tape is traveling in the same direction as that in which it was recorded (which will also be referred to as the forward direction).

Based on these two inputs, ROM 34 outputs the optimum speed information voltage data for normal playback mode. This speed information voltage data is supplied to a D/A converter 35, which converts it to an analog speed information voltage signal for output through terminal 36 to the frequency detector 20 shown in FIG. 1.

Figure 3:
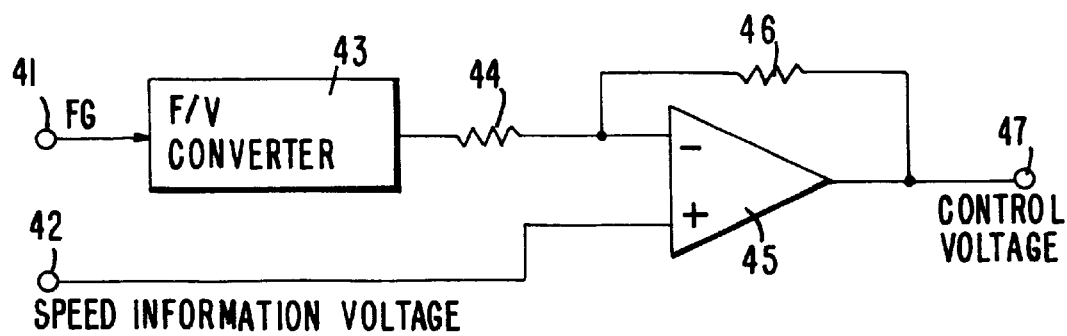
FIG. 3 is a block diagram of a circuit for a frequency detector used in the embodiment of FIG. 1.

FIG. 3 is a schematic diagram showing an example of a circuit that could be used for the frequency detector 20 of FIG. 1. Through an input terminal 41, a frequency/voltage (F/V) converter 43 receives, as its input, the speed detection signal from the frequency generator 16 shown in FIG. 1. The F/V converter 43 converts this input to a voltage, the instantaneous level of which corresponds to the frequency of the F/V converter input, and outputs this voltage to the inverting input of an adder made up of a resistor 44, an operational amplifier 45, and a feedback resistor 46. The signal applied via input terminal 42 to the non-inverting input of this adder is the speed information voltage Vn received from the speed information voltage generator 18 of FIG. 1, indicating that the system is in normal playback mode. The adder adds these signals applied to its inverting and non-inverting inputs, and outputs the result as a control voltage, through output terminal 47.

Returning again to FIG. 1, the control voltage output of this frequency detector 20 is supplied through a loop filter 24 to a motor drive amplifier (MDA) 25, where it is power-amplified and applied to the drum motor 11 as a motor drive voltage to control its speed of rotation. The feedback loop made up of the drum motor 11, FG 16, frequency detector 20, loop filter 24, and MDA 25 forms a speed control servo loop through which the speed of rotation of the motor 11 is variably controlled so as to maintain the prescribed relationship between the speed detection signal from the FG 16, and speed information voltage Vn, which represents the speed in normal playback.

The phase detection signal taken from the PG 17 is supplied to a phase detector 21, where the polarity of the signal is detected to convert it to a head-switching pulse signal HSW. This HSW signal, a rectangular wave that switches polarity each half rotation of the rotary drum 10, is then wave-shaped to form a ramp signal. This ramp signal is then phase-compared to a reference signal, from an oscillator 22, whose frequency is equal to the original half-revolution pulse frequency of the rotary drum 10, and the resulting phase-error signal is input to terminal 23*a* of a switching circuit 23. When the system is in the normal playback mode, a switching signal (not shown) operates the switching circuit 23 to select terminal 23*a* for its output, thus applying the above phase-error signal output of the phase detector 21, through the switching circuit 23, to an input of the loop filter 24, which passes only certain frequency components. In addition, the signal is power-amplified by the MDA 25, to be applied to the drum motor 11 as a motor drive voltage to control its rotational phase.

The above feedback loop, made up of the drum motor 11, PG 17, phase detector 21, switching circuit 23, loop filter 24 and MDA 25, constitutes a phase control servo loop for variably controlling the rotational phase of the drum motor 11 so as to synchronize the rotational phase of the drum 10 with the reference signal from the oscillator 22.

Rotary heads (magnetic heads) Ha and Hb rotate as a single unit with the rotation of the drive motor 11, the speed and phase of which is controlled as described above. Rotary heads Ha and Hb reproduce digital data from pre-recorded slant tracks on the pre-recorded tape 14, alternating between adjacent tracks with each half turn of rotary drum 10. The playback digital data from each track is fed through a rotary transformer (not shown) to the associated playback amplifier (26 or 27), where it is amplified and supplied to a terminal (28*a* or 28*b*) of a switching circuit 28. Once each half rotation of the rotary drum 10, under control of the head-switching signal HSW generated in the phase detector 21, this switching circuit 28 selects the playback digital data signal from one of the rotary heads, Ha or Hb, (i.e., it selects the playback digital data from the head that is currently scanning magnetic tape 14) for output through terminal 29. From terminal 29 the playback signal is output to final stage signal processing circuits (not shown) such as equalization circuits. The normal playback mode operation described above is the same as that of prior helical scan-type magnetic playback systems.

Next, high-speed playback operation will be described. During high-speed playback the switching circuit 23 is operated to the terminal 23*b* side. This disconnects the phase-error signal output of the phase detector 21 from the input of the loop filter 24, thus opening the phase control servo loop described above. Also during high-speed playback modes, the speed information voltage output by the speed information voltage generator 18 is as follows:
In fast forward (FF) playback, the speed information voltage generator 18 outputs a voltage that is higher than the speed information voltage Vn output during normal playback.
In fast reverse (REW) playback, playback is performed with the magnetic tape 14 traveling in the reverse direction (the direction opposite to that in which it was recorded). This occurs at a faster speed than that at which it was recorded. The speed information voltage generator 18 outputs voltage that is lower than the speed information voltage Vn output during normal playback.

Figure 4A:
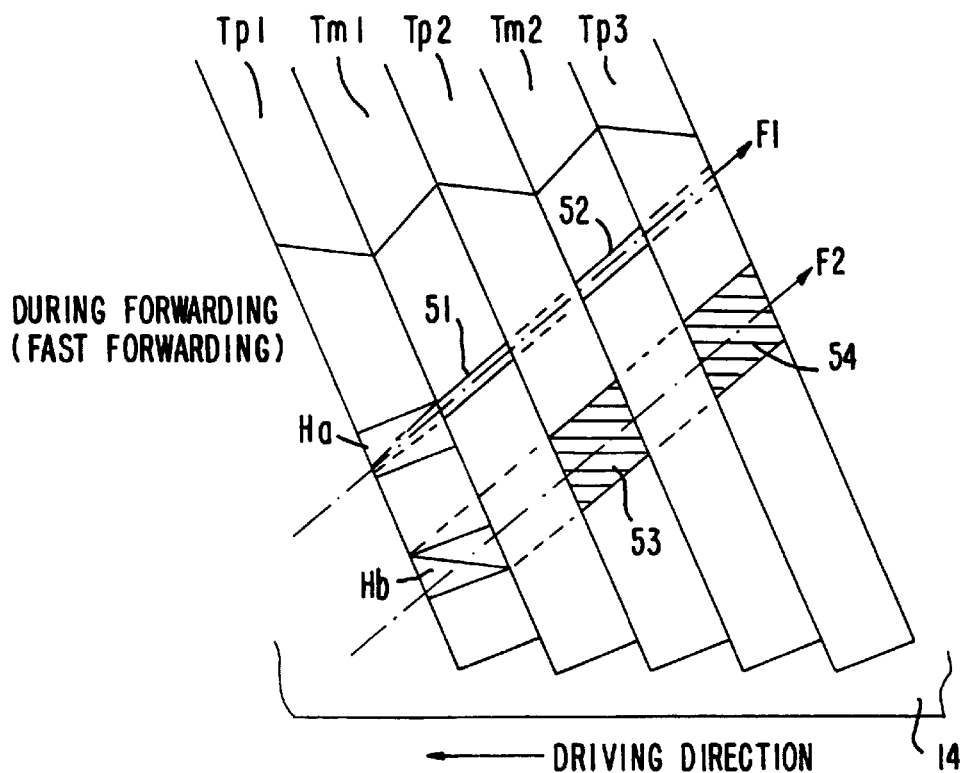
FIGS. 4(A) and 4(B), shows the relationships between the paths scanned by the heads and the scanned areas of the tracks during fast forward playback and fast reverse playback.
Figure 4B:
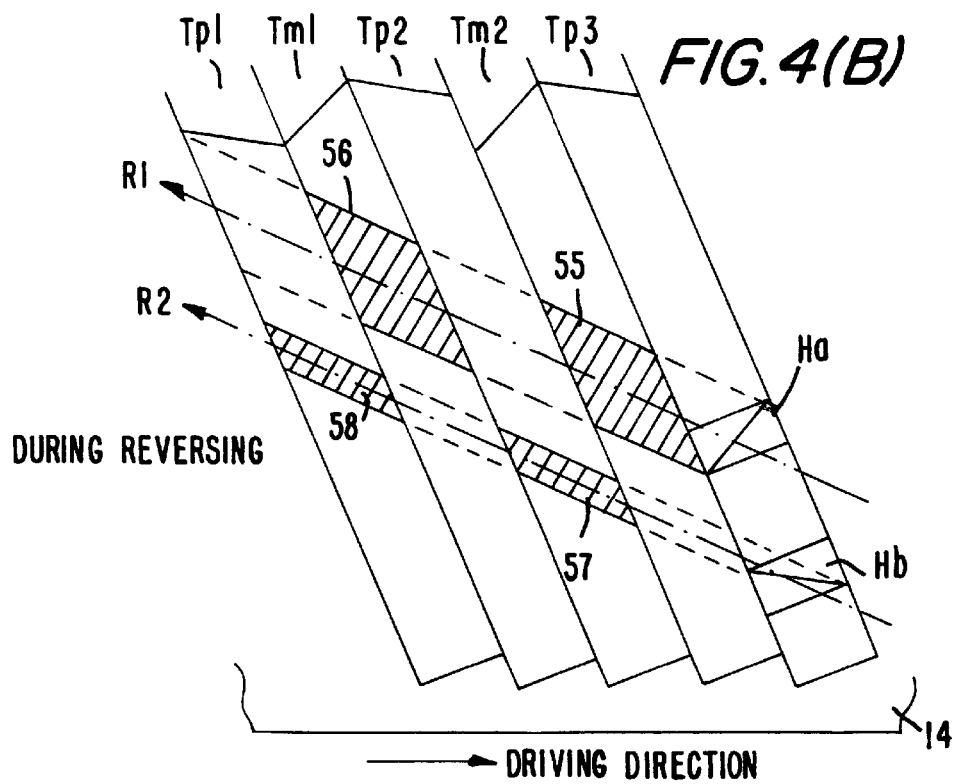

During fast forward playback, as shown in FIG. 4(A) for example, the rotary head Ha scans the tape in the direction of the arrow, inscribing the scan path F1. Rotary head Hb scans the tape in the direction of the arrow, inscribing the scan path F2. As shown in FIGS. 4(A) and 4(B), the tracks previously recorded on the magnetic tape 14 are tracks Tm1 and Tm2, which were recorded by a rotary head having the same −30 degree azimuth angle as rotary head Ha, and tracks Tp1, Tp2, and Tp3, recorded by a rotary head having the same +30 degree azimuth angle as rotary head Hb. The recorded tracks are positioned alternating between plus azimuth tracks and minus azimuth tracks (in Tp1-Tm1-Tp2-Tm2-Tp3 sequence), with no guard bands. On the other hand, during fast reverse playback, as shown in FIG. 4(B), for example, the rotary head Ha might scan the tape in the direction of the arrow, inscribing the scan path R1, with rotary head Hb scanning the tape in the direction of the arrow, inscribing the scan path R2.

It is well known that due to the azimuth loss effect, any playback signals obtained by rotary heads Ha and Hb from tracks recorded by rotary heads having azimuth angles different from their own will be extremely degraded, and that usable playback signals can be obtained only from tracks recorded by rotary heads having azimuth angles the same as their own. Thus during fast forward playback, shown in FIG. 4(A), rotary head Ha can obtain a playback signal from scanned area 51 of track Tm1 and scanned area 52 of track Tm2, and rotary head Hb can obtain a playback signal from scanned area 53 of track Tp2 and scanned area 54 of track Tp3. Similarly, during fast reverse playback, shown in FIG. 4(B), rotary head Ha can obtain a playback signal from scanned area 55 of track Tm2 and scanned area 56 of track Tm1, and rotary head Hb can obtain a playback signal from scanned area 57 of track Tp2 and scanned area 58 of track Tp1.

The amount of playback signal reproduced from a track is proportional to the size of the scanned area. Therefore, because in fast forward playback, as can be seen in FIG. 4(A), scanned areas 53 and 54 are larger than scanned areas 51 and 52 (due to the apparent rotation of both head gaps relative to the recorded tracks), more playback data with a good signal-to-noise (S/N) ratio will be obtainable from rotary head Hb (+30° azimuth) than from rotary head Ha (−30° azimuth). In fast reverse playback, on the other hand, as can be seen in FIG. 4(B), because scanned areas 55 and 56 are larger than scanned areas 57 and 58, more playback data with a good signal-to-noise (S/N) ratio will be obtainable from rotary head Ha (−30° azimuth) than from rotary head Hb (+30° azimuth).

In this embodiment, the rotation of the rotary drum 10 is controlled so as to make the playback data rate of the rotary head Hb (+30° azimuth) playback signal in fast forward playback mode the same as the data rate when the signal was recorded, and to make the playback data rate of the rotary head Ha (−30° azimuth) playback signal in fast reverse playback mode the same as the data rate when that signal was recorded.

To do this, speed information voltage data (representing the speed of rotation of the rotary drum 10) is computed and written in advance into the ROM 34 of the speed information voltage generator 18 shown in FIG. 2. This ROM data is computed so that the speed of the rotary drum 10 will be such that the playback data rate of the rotary head Hb (+30° azimuth) playback signal in fast forward playback mode, and the playback data rate of the rotary head Ha (−30° azimuth) playback signal in fast reverse playback mode will be the same as the data rate when those signals were recorded.

Slant tracks are recorded on the magnetic tape 14 at a rate of 60 tracks per second. As discussed earlier, a digital data signal of 356 sync blocks, with headers, etc., is recorded in each diagonal track. Since each sync block contains 112 bytes, this equates to a recording data rate of 19.138560 Mbps ($356 \times 60 \times 112 \times 8 \div 10^6$).

Also, if
the diameter of the rotary drum 10 is 62 mm,
the still picture scan angle (the scan angle with the tape stopped) is 5.9353 degrees,
the still picture scan length is 97.3894 ($=62\pi/2$) mm,
the scan angle at normal speed is 5.9523 degrees,
the scan angle at the 100× speed is 8.2948 degrees, and
the scan angle at the −100× speed is 4.6186 degrees,
then at "100×" speed, if the rotary drum 10 were to spin at the same speed as during normal playback, the rotary head Ha playback data rate would be only 13.4209 Mbps, and the rotary head Hb playback data rate would be only 14.0701 Mbps (well below the 19.12856 Mbps data rate at which the signal was recorded, as discussed above).

Also, in fast forward playback mode, because of the larger scan area of the plus azimuth head in this mode, the playback signal from rotary head Hb (+30° azimuth) is selected. Therefore, speed information voltage data for a speed information voltage greater than Vn (the normal playback speed information voltage) is stored in ROM 34. The value of this data will be such as to increase the rotary drum 10 speed enough to increase the Hb data rate at the 100× speed from the 14.0701 Mbps it would be if the drum were allowed to spin at the normal mode speed, to the 19.13856 Mbps rate at which the signal was recorded.)

On the other hand, at "−100×" speed, under the same conditions, the data rates of playback data from rotary heads Ha and Hb, respectively, will be 24.9718 Mbps and 24.3094 Mbps. These data rates are higher than the record signal data rate.

Also, in this fast reverse playback mode, because of the larger scan area of the minus azimuth head in this mode, the playback signal from rotary head Ha (−30° azimuth) is selected. Therefore, speed information voltage data for a speed information voltage less than Vn (the normal playback speed information voltage) is stored in ROM 34. The value of this data will be such as to decrease the rotary drum 10 speed enough to decrease the Ha data rate at the −100× speed from the 24.9718 Mbps it would be if the drum were allowed to spin at the normal mode speed, to the 19.13856 Mbps rate of the record signal.

In summary, in this embodiment, during high-speed playback, the speed of rotation of the drum motor 11 is variably controlled to maintain a prescribed relationship between the high-speed playback mode speed information voltage output by the frequency detector 20, and the speed detection signal output by the FG 16. In fast forward playback mode, the drum speed is controlled to cause the playback data rate of the playback signal from rotary head Hb (+30° azimuth) to be the same as the data rate of the signal when it was recorded. During fast reverse playback, the drum speed is controlled to cause the playback data rate of the playback signal from rotary head Ha (−30° azimuth) to be the same as the data rate of the signal when it was recorded. In this manner, this embodiment of the present invention is able to perform highly efficient extraction of data from the recorded tape.

FIG. 5 is a block diagram of a second embodiment of the magnetic playback system incorporating the principles of the present invention. Parts of this drawing that are the same as those shown in FIG. 1 have the same reference numbers.

In the embodiment shown in FIG. 5, when the system goes into a high-speed mode, the speed of the drum motor 11 remains constant. In this embodiment, it is an equalizer 63, and the center frequency of a voltage-controlled oscillator (VCO) within a clock extraction phase-locked loop (PLL) 65 that are controlled.

During special (other than normal) playback modes, when the speed of rotation of the rotary drum is held constant (when it is kept at the same speed as in the normal playback mode) a difference will be created between the playback data rates of the signals from the plus azimuth angle and minus azimuth angle rotary head. This difference is large for azimuth angles of ±30 degrees, and is especially large if the tape speed in fast playback modes is ±100 or more times that in normal playback mode. Therefore, if the input to a phase-locked loop (PLL) is switched to select one or the other of the two rotary head playback signals, according to the polarity of the head-switching pulse, and a clock extracted from the PLL, one of the rotary head playback signals will be able to achieve a stable PLL lock, but the other will have difficulty doing so. Also, even when the PLL is able to achieve a lock on both rotary head playback signals, there will be problems with excessive lock-in time, the existence of a constant phase error, etc., and difficulty in locking the PLL on the best phase.

Also, since there are huge variations in the playback data rate when the speed of rotation of the rotary drum is held constant during high-speed playback modes, a method was arrived at wherein the drum speed is changed to keep the tape-to-head relative speed the same as it is in normal playback, in order to extract data from the tape. To eliminate the difference in tape-to-head relative speed due to the fact that an angle exists between two rotary heads whose azimuth angles are different from each other, the speed of the drum must either speed up or slow down each time a rotary head scans the tape (i.e., the drum has to change speed once each half revolution it makes). The drum speed-change response is too sluggish for this to be practical.

Therefore, in this embodiment, during high-speed playback, the speed of rotation of the rotary drum 11 is held constant, and the equalizer 63, and the center frequency of a voltage-controlled oscillator (VCO) within a clock extraction PLL (phase-locked loop) 65 are controlled to match the playback data rate of the rotary head that is currently obtaining the most data.

To describe the operation of the embodiment of FIG. 5, it will be assumed that the head-switching pulse HSW is generated as described earlier in the description of the phase detector 21 of FIG. 1. As shown in FIG. 5, the switching circuit 28 is controlled by HSW pulses to alternately switch between the rotary head Ha playback signal and rotary head Hb playback signal for selection as the input to the equalizer 63, where a known waveshape equalization process is performed.

Figure 6:
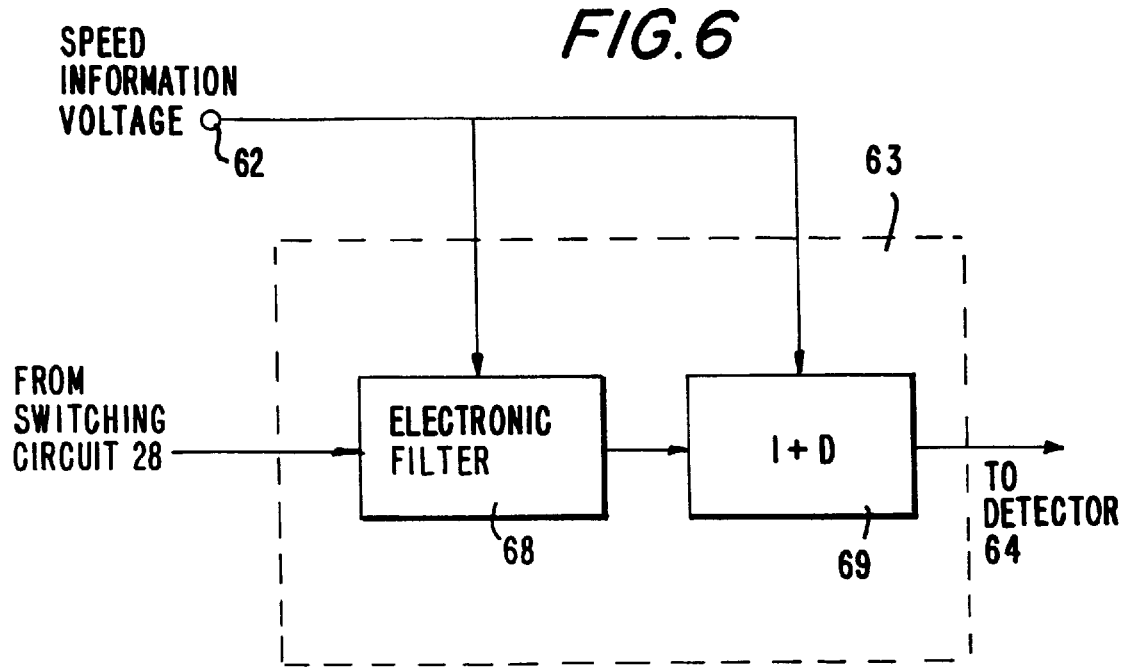
FIG. 6 is a block diagram of a circuit for an equalizer used in the embodiment of FIG. 5.

In recent years, as illustrated in FIG. 6, it has become common to implement this equalizer 63 in a configuration that uses an electronic filter whose frequency characteristic is determined by voltage control. As shown in FIG. 6, the configuration is made up of an electronic filter 68 and a delay and adder circuit (1+D) 69 that performs a partial response process. The frequency response characteristic of electronic filter 68 is variably controlled by the speed information voltage input via terminal 62. Delay and adder circuit 69 uses a voltage-controlled variable delay line to variably control the delay D.

Figure 7:
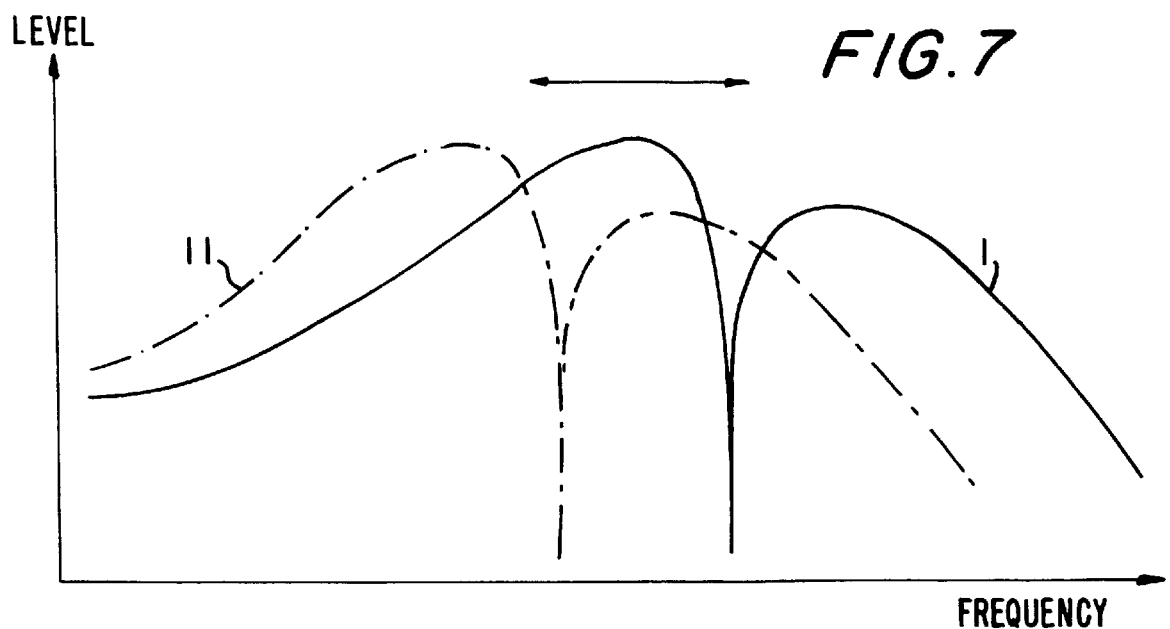
FIG. 7 is graphical waveform illustrating changes in the frequency response characteristic of the equalizer of FIG. 6.

The speed information voltage input at terminal 62 is generated from data stored in a ROM, the same as was done in the first embodiment. During fast playback, this speed information voltage alternates between a value that optimizes the equalization characteristic of equalizer 63 for the playback signal from rotary head Hb (+30° azimuth) and a value that optimizes the equalization characteristic for the playback signal from rotary head Ha (−30° azimuth). FIG. 7 is a graphical representation of the frequency response of the equalizer 63 wherein the variation in amplitude with frequency is shown. It can be seen that in fast forward playback, the frequency response characteristic is switched, for example, from one for the lower-than-normal playback data rate indicated by the solid line I, to that for the higher-than-normal playback data rate indicated by the dash-dotted line II.

Referring again to FIG. 5, the playback signal that has been waveshape-equalized by the equalizer 63 is supplied to a detector 64. There it is compared to a threshold voltage and wave-shaped to form a binary detection data output signal for input to a discriminator 66 and the phase-locked loop 65. From its detection data input, PLL 65 extracts a clock for that data, which it supplies to the discriminator 66. The discriminator 66 uses this extracted clock to latch the detection data output of the detector 64 prior to outputting it as playback data.

Figure 8:
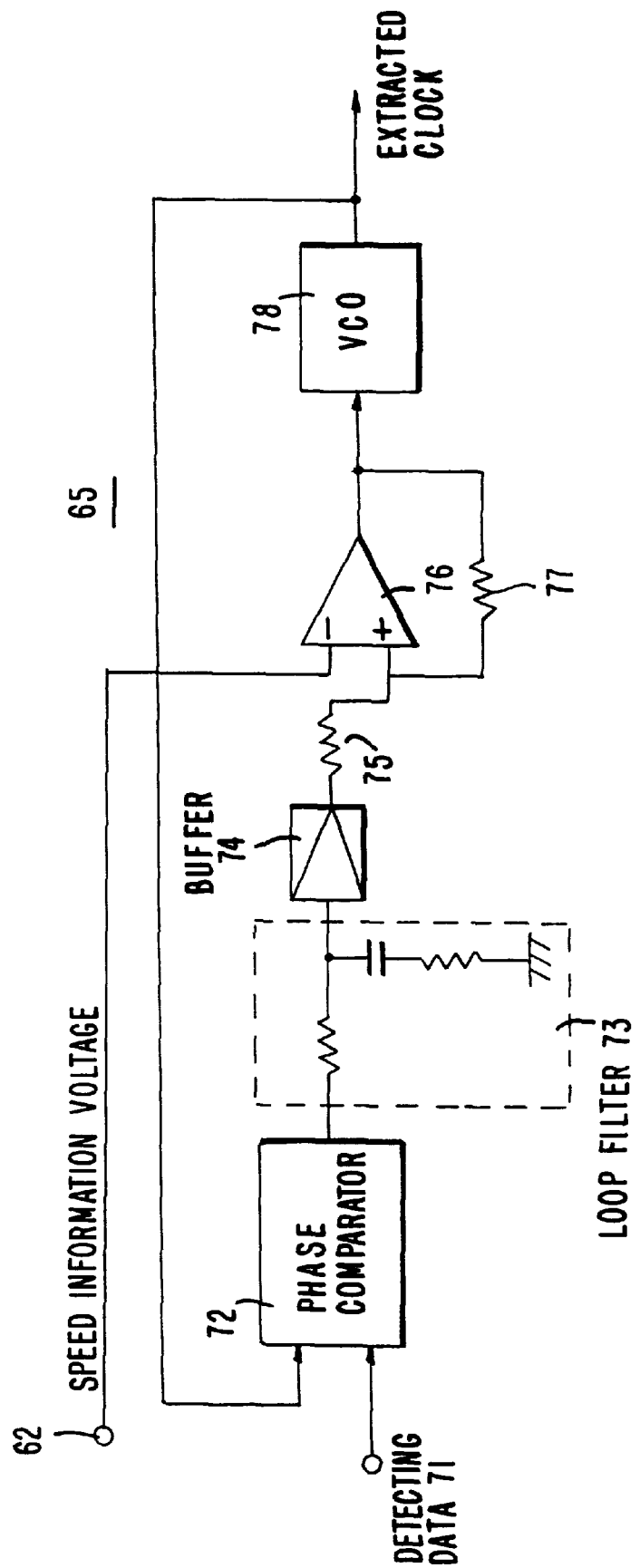
FIG. 8 is a block diagram of a circuit for a phase-locked loop used in the embodiment of FIG. 5.

The speed information voltage received at the terminal 62 and applied to the input of the PLL 65 is shown in FIG. 8. It is used to control the center frequency of an internal VCO 78. That is, the detection data from the detector 64 (FIG. 5) input via terminal 71 in FIG. 8, is supplied to a phase comparator 72 where it is phase-compared with the signal from the VCO 78. VCO 78 outputs a phase-error signal corresponding to the phase difference between these two input signals. This phase-error signal is passed through a loop filter 73, which removes its unwanted high-band frequency components, after which it is buffer-amplified by a buffer amplifier 74. The output of the buffer amplifier 74 is supplied to one input of a subtraction circuit made up of an input resistor 75, operational amplifier 76, and feedback resistor 77. This subtraction circuit takes the difference between this input signal and the speed information voltage received via terminal 62 and applies it to the VCO 78 as a control voltage to control the output frequency of the oscillator 78. The output signal of the VCO 78 is applied to the phase comparator 72 as a comparison signal.

This PLL 65 configuration results in the output of a clock signal that is phase-locked to a clock signal within the detection data; i.e., a playback data clock signal. The center frequency of the VCO 78 is controlled by two signals: the phase-error signal from the phase comparator 72, and the speed information voltage input via terminal 62. During fast forward playback this speed information voltage, which is the same as the speed information voltage input to the equalizer 63, controls the center frequency of the VCO 78 to set it to a lower frequency than that used during normal playback, to match it to the data rate of the rotary head Hb (+30° azimuth) playback signal. Conversely, during fast reverse playback, it switches the center frequency of the VCO 78 to a higher frequency than that used during normal playback, to match it to the data rate of playback signal from rotary head Ha (−30° azimuth).

In this manner, during fast forward playback, equalization is performed with characteristics optimized for the rotary head Hb (+30° azimuth) playback signal, and the clock for that playback signal reproduced (extracted), in order to output playback data from the rotary head Hb playback signal from the discriminator 66. Conversely, during fast reverse playback, equalization is performed with characteristics optimized for the rotary head Ha (−30° azimuth) playback signal, and the clock for that playback signal reproduced (extracted), to output playback data from the rotary head Ha playback signal from the discriminator 66.

As discussed earlier, during fast forward playback, more playback data is obtained from rotary head Hb than from rotary head Ha, and in fast reverse playback, more playback data is obtained from rotary head Ha than from rotary head Hb. Thus, even though this causes the playback data rate to fluctuate during high-speed playback, highly efficient data extraction can be achieved in a low-cost system by employing the principles of this embodiment.

Moreover, previously, in Japanese patent application no. H8-34356 (1996), the applicant proposed a magnetic recording playback system wherein, during special playback modes of the playback signals from two rotary heads whose azimuth angles are different from each other, the playback signal used is the one from the head having the azimuth angle that provides the larger scanned area from which a playback signal can be obtained. This system, however, extracts control data contained in the above playback signals and uses it to control playback operation. Unlike the present embodiment, the previously proposed system does not obtain normal playback data from the playback signal of the head having the azimuth angle that provides the larger scanned area from which a playback signal can be obtained.

Figure 9:
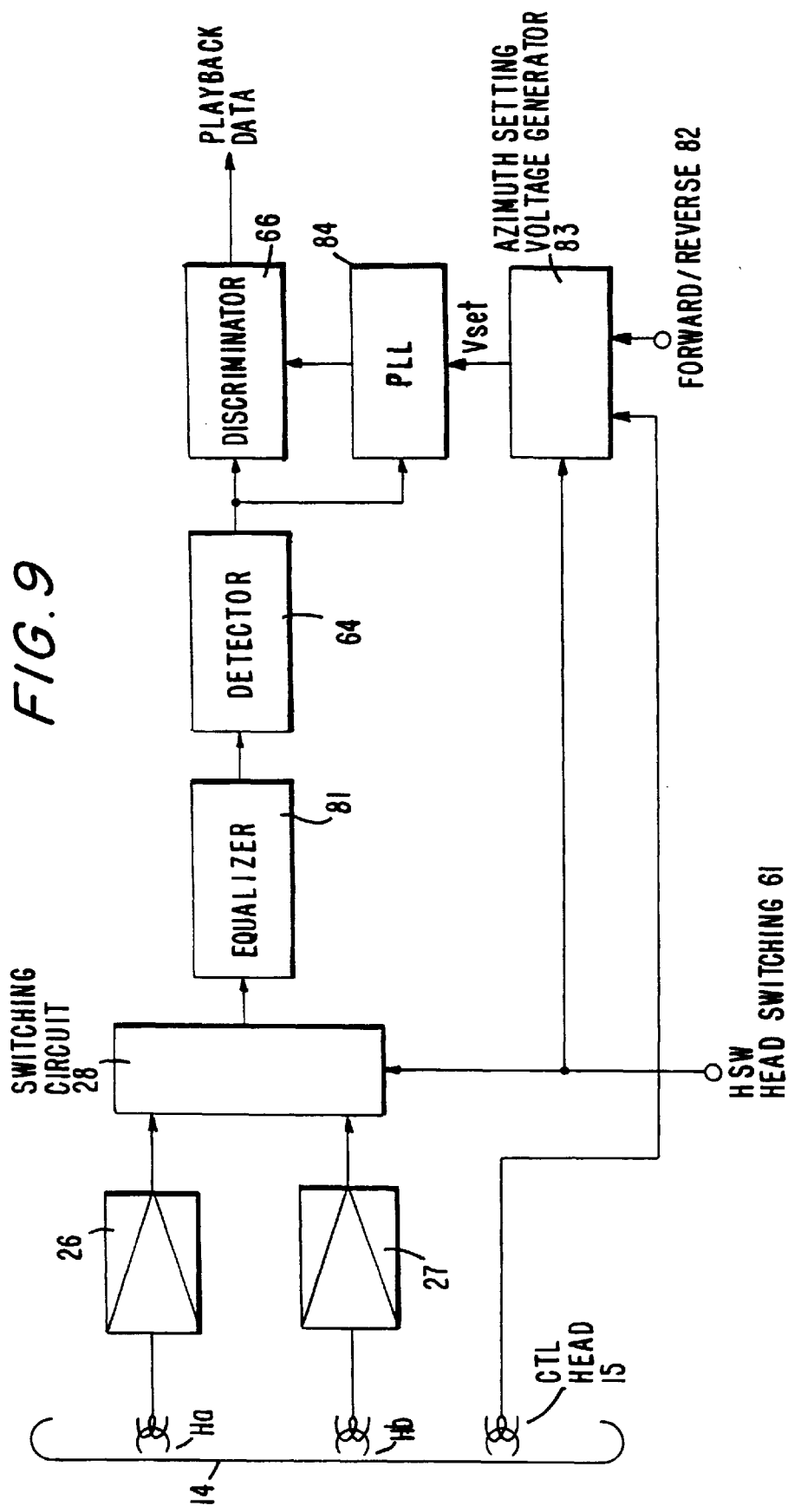
FIG. 9 is a block diagram of a third embodiment of the present invention.

FIG. 9 is a block diagram of a third embodiment of the magnetic playback system incorporating the principles of the present invention. Parts of this drawing that are the same as those shown in FIG. 1 and FIG. 5 have the same reference numbers in FIG. 9 as they had in those drawings, and will not be described here.

In FIG. 9, playback signals from rotary heads Ha and Hb are alternately selected for input to an equalizer 81 by the switching circuit 28, under control of head-switching pulse HSW applied to terminal 61. The fixed-characteristic equalizer 81 waveform equalizes the selected playback signal by a known process, and applies it to the detector 64, which compares it to a threshold value to output it as binary detection data to a phase-locked loop 84 and the discriminator 66.

Figure 10:
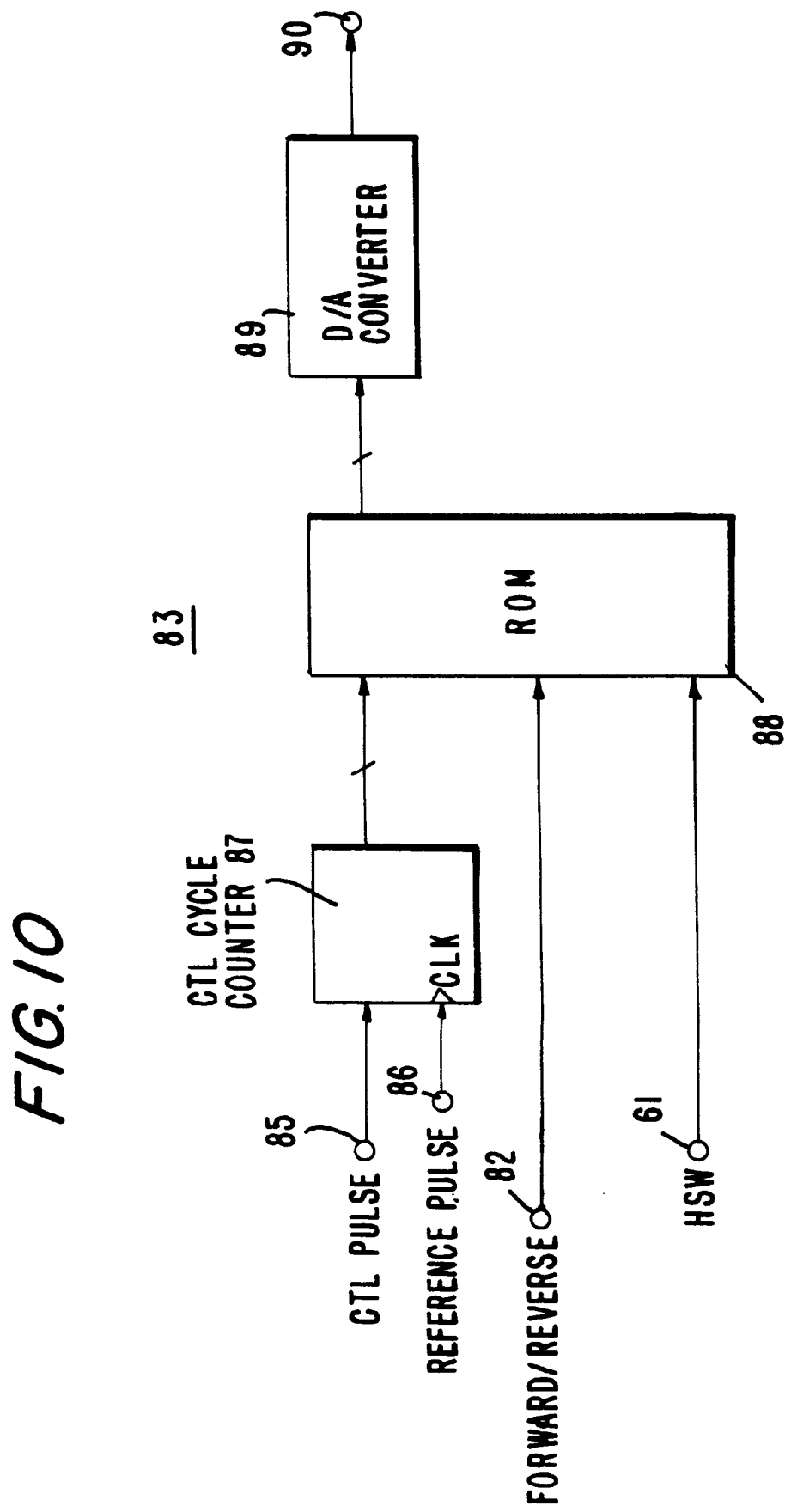
FIG. 10 is a block diagram of a circuit for an azimuth setting voltage generator used in the embodiment of FIG. 9.

An azimuth setting voltage generator 83 generates an azimuth setting voltage Vset based on its three inputs: a playback CTL pulse picked up from the CTL track of a pre-recorded tape 14 by a CTL head 15; the FWD/REV tape direction signal received at terminal 82, and the HSW head-switching pulse at terminal 61. As shown in FIG. 10, this azimuth setting voltage generator 83 is made up of a CTL cycle counter 87, a ROM 88, and a D/A converter 89.

Calculated and stored in advance in ROM 88 are voltage data settings for setting the optimum VCO center frequency in the PLL 84 for each high-speed playback speed multiple, and each rotary head Ha and Hb playback data rate, with a separate set of data for each rotary head. In other words the data stored in ROM for fast forward playback sets the VCO center frequency lower than that used during normal playback, and also lower during playback from rotary head Ha than it is during playback from rotary head Hb. Conversely, the data stored in ROM for fast reverse playback sets the VCO center frequency higher than during normal playback, and also higher during playback from rotary head Ha than it is during playback from rotary head Hb.

The CTL pulse cycle counter 87 counts the number of reference pulses of a specific high frequency being applied to its clock terminal via terminal 86 that occur during one cycle of the playback CTL pulses it receives through terminal 85. The counter 87 outputs the count to the address terminals of the ROM 88. Also input to the address terminals of the ROM 88 are the FWD/REV tape direction signal from terminal 82, and the head-switching pulse HSW from terminal 61. Since the time of one cycle of the playback CTL pulse signal is inversely proportional to the tape speed of the magnetic tape 14, the value of the above count output by the CTL frequency counter 87 is also inversely proportional to the tape speed of the magnetic tape 14.

Accordingly, the ROM 88 outputs VCO center frequency data settings that correspond to the current tape speed and direction of the magnetic tape 14. The data are also switched in sync with the state of the head-switching pulse HSW to reflect the respective playback data rates for rotary heads Ha and Hb. The digital data output from the ROM 88 is converted to an analog signal by the D/A converter 89 for output as the azimuth setting voltage Vset. The setting voltage Vset is applied through terminal 90 as an input to the PLL 84 (FIG. 9).

Figure 11:
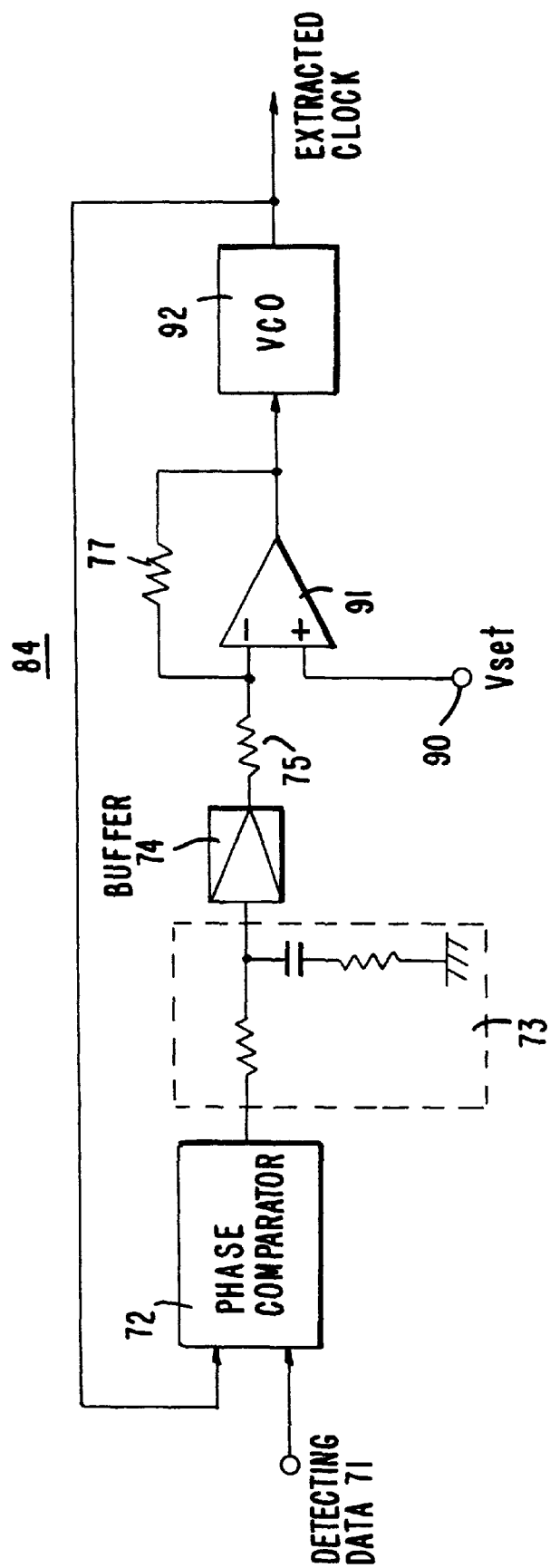
FIG. 11 is a block diagram of a circuit for a phase-locked loop used in the embodiment of FIG. 9.

The PLL 84 is configured as shown in FIG. 11. Parts of this drawing that are the same as those shown in FIGS. 8 and 10 have the same reference numbers in FIG. 11 as they had in those drawings, and will not be described here. In FIG. 11, the above azimuth setting voltage Vset is applied through terminal 90 to the non-inverting input of an operational amplifier 91, which takes the difference between this signal and a phase-error signal at its inverting input, and applies the resulting output voltage to a VCO 92 as a control voltage to control its frequency of oscillation. The center frequency of this VCO 92 is determined by the azimuth setting voltage Vset input via terminal 90.

This makes it possible to obtain, from the VCO 92 of the PLL 84, a signal that is individually phase-locked to the respective playback signal clocks of rotary head Ha and Hb in high-speed playback operation, which is then applied to the discriminator 66 in FIG. 9. Accordingly, even if there is a large difference between the data rates of the playback data supplied by discriminator 66 for rotary head Ha (−30° azimuth) and rotary head Hb (+30° azimuth) during high-speed playback, it will be possible to achieve stable phase lock by inputting to the PLL 84, the playback signal from either rotary head Ha or rotary head Hb. Thus it will be possible to properly extract the clock components of these playback signals, and to obtain the proper playback data from the discriminator 66. Also, in this embodiment, playback data can be obtained from both of the rotary heads Ha and Hb, not just the one providing the better signal.

Magnetic playback systems using the above PLL 84 can be used in a system in which the speed of rotation of the rotary drum is changed according to the speed at which the tape is being fed in order to keep the relative speed between the magnetic tape 14 and the rotary heads Ha and Hb during especially high-speed playback the same as it is in normal playback. It can be used as well in systems in which the drum speed is held constant regardless of the absolute speed at which the tape is traveling. It should be noted, however, that in either case, there will be a difference between the playback data rates of the heads due to the azimuth.

When a drum servo system is used to control the drum speed so as to maintain a constant relative speed between the rotary heads (Ha and Hb) and the magnetic tape 14, a PLL 84 can be used to extract a clock, as is done in the above third embodiment. In systems where the drum speed is left constant, however, sometimes it is not enough just to set the center frequency of the VCO in the phase-locked loop. That is, during especially high-speed operation, the difference between the data rates of the playback signals from rotary heads Ha and Hb can become so large that the waveform equalization characteristics of the equalizer 81 cannot be adequately adapted.

Figure 12:
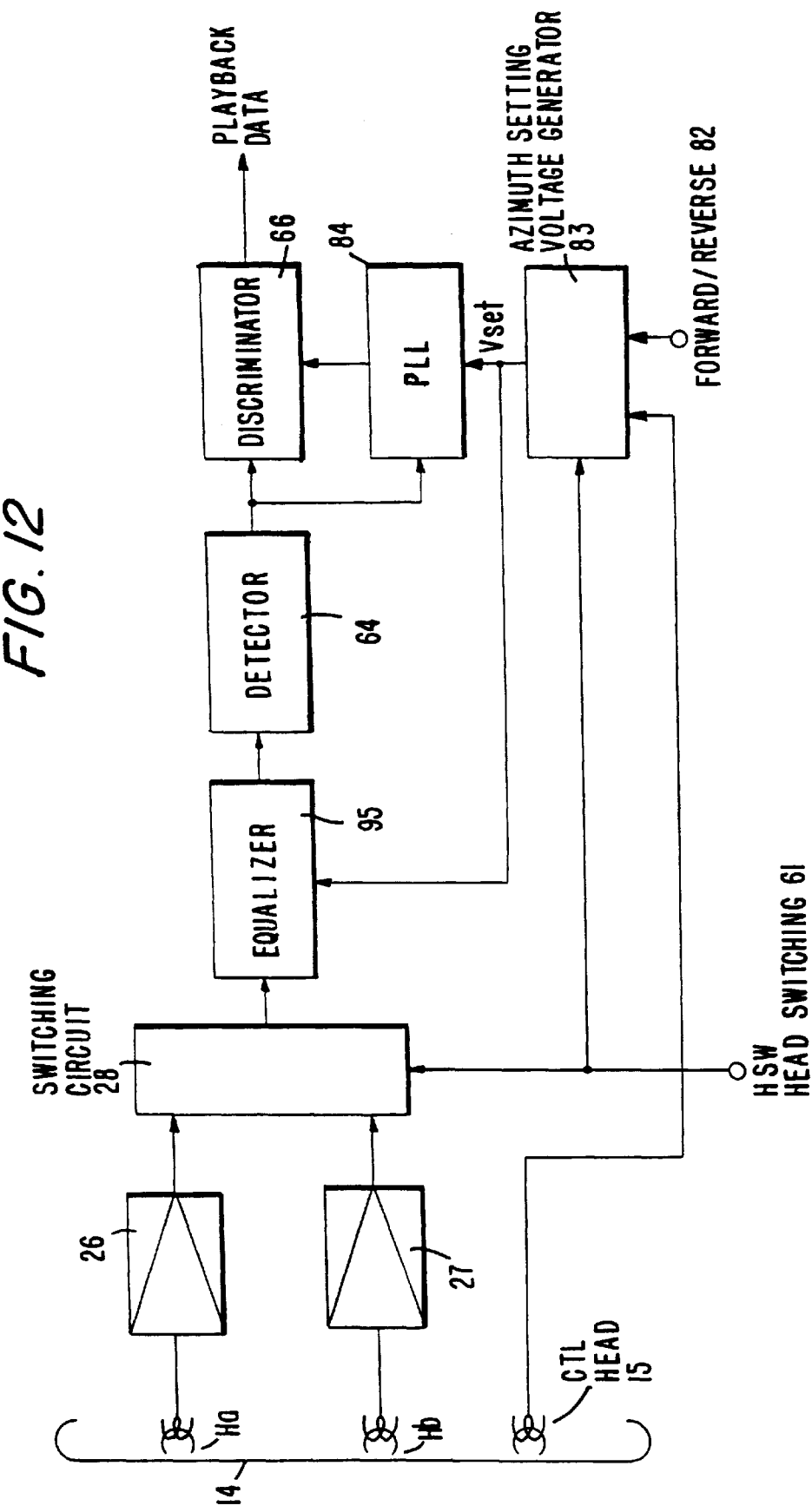
FIG. 12 is a block diagram of a fourth embodiment of the present invention.

FIG. 12 shows a block diagram for the magnetic playback system of a fourth embodiment of the invention that is capable of efficient high-speed data playback even in systems in which the drum speed is held constant. Parts of this drawing that are the same as those shown in FIG. 9 have the same reference numbers in this drawing, and will not be described. In the system of FIG. 12, the equalization characteristic of an equalizer 95 is controlled by the voltage setting output of the azimuth setting voltage generator 83, which switches the center frequency of the VCO of PLL 84 between two frequencies, in sync with the head-switching pulse signal HSW.

The equalizer 95 comprises an electronic filter whose frequency response characteristic is controlled by its input voltage. In the circuit of FIG. 12, the optimum frequency response characteristic for each tape speed data rate is set by applying the same voltage setting to this equalizer 95 as is applied to the PLL 84 by the azimuth setting voltage generator 83. Because this voltage is set to values that will give the optimum azimuth angles for the two rotary heads Ha and Hb in sync with the head-switching pulses HSW, as described earlier, the optimum equalization characteristic can be obtained for each azimuth angle.

In the above third and fourth embodiments, the speed of rotation of the rotary drum can be changed according to the speed at which the tape is being fed, in order to keep the relative speed between the magnetic tape 14 and the rotary heads Ha and Hb during high-speed playback the same as it is in normal playback. Also, the dram speed can be held constant regardless of the speed at which the tape is traveling. However, since in either case the playback data rates of the heads will be different because of their different azimuths, the settings for both the center frequency of the VCO in the PLL 84 and the equalization characteristic of the equalizer 95 are switched in synchronization with the head-switching pulses HSW.

The higher the tape speed during high-speed playback, however, the larger will be the difference in the playback data rate due to azimuth difference. Consequently, the larger will be the required changes in the center frequency of the VCO 92 in the PLL 84 (FIG. 11), and in equalizer 95 equalization characteristic values. Therefore, as still another embodiment of the present invention, in order to minimize the changes in the above values, the system may be configured to change both the drum speed and the clock extraction VCO center frequency as the heads are switched. That is, the system may be configured such that the speed of rotation of the rotary drum is shifted according to the polarity of the head-switching pulses HSW such that during fast forward playback, the rotary head Ha playback data rate will be lower than in normal playback mode, and the rotary head Hb playback data rate will be higher than in normal playback mode. During fast reverse playback the rotary head Ha playback data rate will be higher than in normal playback mode and the rotary head Hb playback data rate will be lower than in normal playback mode. The center frequency of the VCO in the clock extraction PLL is also switched according to the polarity of the head-switching pulses HSW. When this is done, the frequency response characteristic of the equalizer 95 may also be switched according to the polarity of the head-switching pulses HSW.

To shift the speed of rotation of the rotary drum during high-speed playback according to the polarity of the head-switching pulses HSW, as described above, the drum motor phase control servo loop can be opened, as in the embodiment of FIG. 1. The speed information voltage is supplied to the frequency detector 20 in the drum motor speed control servo loop switched according to the polarity of the head-switching pulses HSW.

Moreover, the present invention is not limited to the above embodiments. The apparatus incorporating the principles of the present invention may be applied, for example, in a magnetic playback system configuration wherein the rotary heads comprise a first rotary head of a first azimuth angle and a second rotary head of a second azimuth angle placed in close proximity to form a first double azimuth head group; a third rotary head of the second azimuth angle placed in a point-symmetrical position relative to the first rotary head, with the center of rotation of the rotary drum as the center, a fourth rotary head of the first azimuth angle positioned in a point-symmetrical position relative to the second rotary head, centered on the above center of rotation; the third and fourth rotary heads thus forming a second double azimuth head group; and wherein once each half-rotation period of the rotary drum, a pair of parallel tracks is formed by each of the above first and second double azimuth head groups, in alternation. Neither is application of the present invention limited to playback-only systems: It may, of course, also be used in playback systems of helical scan magnetic recording and playback systems.

According to the embodiments of the present invention as described above, the playback signal data rate of a prescribed one of the rotary heads is made equal to the data rate of the recorded digital data signal. A playback signal can be obtained from that prescribed one of the rotating heads, as determined according to the direction of travel of the magnetic tape during high-speed playback. The rotary head having the larger scan area from which a playback signal can be obtained is selected as that prescribed one of the rotating heads. Therefore, highly efficient data playback during high-speed playback can be achieved.

In accordance with a preferred embodiment of the present invention, the center frequency of a voltage-controlled oscillator within a phase-locked loop for extracting a clock signal from a playback signal is set to a frequency. The equalization characteristic of an equalizer is set to an equalization characteristic which is matched together with the set frequency to the data rate of the playback signal from one of two rotary heads. This is determined according to the direction of travel of the magnetic tape during high-speed playback Therefore, highly efficient data playback can be achieved during high-speed playback using a single phase-locked loop, and a single equalizer.

In a preferred embodiment during high-speed playback, a data rate difference to created in the playback signal from one or the other of a first and second rotary head due to an azimuth angle difference therebetween. A clock signal for the playback signal from either of the first and second rotary heads can be extracted using a single phase-locked loop. An equalization characteristic for the playback signal from either of the first and second rotary heads can be applied using a single equalizer. Therefore, data can be extracted from the playback signals of both the first and the second rotary heads during high-speed playback, in a low-cost system configuration.

In another embodiment, a speed control servo loop is provided for controlling the speed of rotation of a rotary drum. In this manner, during high-speed playback, the data rate of the playback signal from one of a first and second rotary head will be higher than the data rate during normal playback, and the data rate of the playback signal from the other of the first and second rotary heads will be lower than the data rate during normal playback. Accordingly, it is possible to minimize changes in the center frequency of a voltage-controlled oscillator in a phase-locked loop, and changes in the equalization characteristics of an equalizer. This is accomplished by switching their settings in synchronization with a head-switching pulse. Therefore the phase-locked loop can achieve a stable phase lock on the playback signal of either one of the first and second rotary heads, and also, stabilization characteristics can be applied in a stable manner by the equalizer. This results in efficient, stable, and accurate extraction of playback data even during high-speed playback.

Various modifications will become possible for those skilled in the art after receiving the teachings of the present disclosure without departing from the scope thereof.

What is claimed is:

1. A magnetic playback system for playing back pre-recorded signals from a magnetic tape, said signals being digital signals recorded, at a first speed and a first data rate, in adjacent slant tracks on said tape alternating between first and second azimuth angles, said tape also having a control signal recorded thereon, said system comprising:

a rotatable member arranged adjacent said magnetic tape, said member having first and second magnetic playback heads fixedly mounted thereon, said first head being mounted at said first azimuth angle and said second head being mounted at said second azimuth angle with respect to said tape;

means for rotating said rotatable member to generate, respectively, a first and a second playback signal at a playback speed faster than said first speed from said first and second playback heads, as said tape is moved past said playback heads;

means responsive to said control signal recorded on said tape for generating speed information voltage for making the data rate of a selected one of said first and second playback signals equal to said first data rate;

control means for controlling the speed of rotation of said rotatable member in response to said speed information voltage; and wherein said speed information voltage generating means selects said first or second playback signal based on the direction of travel of said tape as determined by said control signal.

2. A system, as claimed in claim 1, wherein said means for rotating said rotatable member is a motor and said control means for controlling the speed of said motor is a speed control servo loop.

3. A system, as claimed in claim 1, wherein said speed information generating means comprises:

counting means for producing a count signal corresponding to the travel speed of said tape based on said control signal;

a memory having data stored therein and responsive to said count signal and to a tape direction signal from said control signal for making the data rate of a selected one of said playback signals equal to said first data rate; and a D/A converter coupled to said memory for converting the data output of said memory to produce said speed information voltage.

4. A system, as claimed in claim 1, wherein said speed information generating means makes the data rate of said first playback signal equal to said first data rate when the direction of travel of said tape is in the same direction as when said data signals were recorded and makes the data rate of said second playback signal equal to said first data rate when the direction of travel of said tape is in the reverse direction as when said data signals were recorded.

5. A magnetic playback system for playing back pre-recorded signals from a magnetic tape, said signals being digital signals recorded, at a first speed and a first data rate, in adjacent slant tracks on said tape alternating between first and second azimuth angles, said tape also having a control signal recorded thereon, said system comprising:

a rotary drum arranged adjacent said magnetic tape, said drum having first and second magnetic playback heads fixedly mounted thereon, said first head being mounted at said first azimuth angle and said second head being mounted at said second azimuth angle with respect to said tape;

a drum motor for rotating said rotary drum to generate, respectively, a first and a second playback signal at a playback speed faster than said first speed from said first and second playback heads, as said tape is moved past said playback heads;

means for generating a head-switching signal, the polarity of which reverses once during each half cycle of rotation of said rotary drum;

switching means responsive to said head-switching signal for combining, in time-series fashion, said first and second playback signals and producing an output playback signal;

an equalizer for equalizing the waveshape of said output playback signal of said switching means and generating an output containing a clock signal;

a phase-locked loop, including a voltage-controlled oscillator having a center frequency, for extracting said clock signal from said output of said equalizer;

a discriminator responsive to the outputs of said phase-locked loop and said equalizer to produce a playback data signal; and a speed information voltage generator for generating a speed information voltage when said first and second playback signals are being produced for setting the center frequency of said voltage-controlled oscillator to a frequency corresponding to the data rate of a selected one of said first and second playback signals.

6. A magnetic playback system, as claimed in claim 5, wherein the selection of one of said first and second playback signals is determined by the direction of travel of said tape during playback.

7. A magnetic playback system, as claimed in claim 5, wherein said equalizer has an equalization characteristic which will adapt said equalizer to the data rate of one of said first and second playback signals as determined by the direction of travel of said tape and the output of said speed information voltage generator.

8. A system, as claimed in claim 5, wherein said speed information generating means makes the data rate of said first playback signal equal to said first data rate when the direction of travel of said tape is in the same direction as when said data signals were recorded and makes the data rate of said second playback signal equal to said first data rate when the direction of travel of said tape is in the reverse direction as when said data signals were recorded.

9. A magnetic playback system for playing back pre-recorded signals from a magnetic tape, said signals being digital signals recorded, at a first speed and a first data rate, in adjacent slant tracks on said tape alternating between first and second azimuth angles, said tape also having a control signal recorded thereon, said system comprising:

a rotary drum arranged adjacent said magnetic tape, said drum having first and second magnetic playback heads fixedly mounted thereon, said first head being mounted at said first azimuth angle and said second head being mounted at said second azimuth angle with respect to said tape;

a drum motor for rotating said rotary drum to generate, respectively, a first and a second playback signal from said first and second playback heads, as said tape is moved past said playback heads;

means for generating a head-switching signal, the polarity of which reverses once during each half cycle of rotation of said rotary drum;

switching means responsive to said head-switching signal for combining, in time-series fashion, said first and second playback signals and producing an output playback signal;

an equalizer for equalizing the waveshape of said output playback signal of said switching means and generating an output containing a clock signal;

a phase-locked loop, including a voltage-controlled oscillator having a center frequency, for extracting said clock signal from said output of said equalizer;

a discriminator responsive to the outputs of said phase-locked loop and said equalizer to produce a playback data signal; and a setting voltage generator responsive to said head-switching signal, said control signal reproduced from said tape and a tape direction signal indicating the direction of travel of said tape during playback, said setting voltage generator generating, during playback at a tape speed faster than said first tape speed, setting voltages that are switched in synchronization with said head-switching signal for setting at least said center frequency of said voltage-controlled oscillator in said phase-locked loop to frequencies corresponding to the data rates of said first and second playback signals.

10. A magnetic playback system, as claimed in claim 9, wherein the equalization characteristics of said equalizer are switched in synchronism with said head-switching signal to adapt the equalization characteristic to the data rate of said first and second playback signals.

11. A system, as claimed in claim 10, wherein said setting voltage generating means comprises:

counting means for producing a count signal corresponding to the travel speed of said tape based on said control signal;

a memory having stored therein, for each tape speed during playback, setting voltages adapted to the playback signal data rates of said first and second playback signals, said memory being responsive to said count signal and to a tape direction signal from said control signal; and a D/A converter coupled to said memory for converting the data output of said memory to produce said setting voltages.

12. A magnetic playback system, as claimed in claim 11, wherein a speed control servo loop is coupled to said drum motor for controlling the speed of said drum motor such that during playback, the data rate of one of said first and second playback signals will be higher than said first data rate and the data rate of the other of said first and second playback signals will be lower than said first data rate.

13. A system, as claimed in claim 9, wherein said setting voltage generating means comprises:

counting means for producing a count signal corresponding to the travel speed of said tape based on said control signal;

a memory having stored therein, for each tape speed during playback, setting voltages adapted to the playback signal data rates of said first and second playback signals, said memory being responsive to said count signal and to a tape direction signal from said control signal; and a D/A converter coupled to said memory for converting the data output of said memory to produce said setting voltages.

14. A magnetic playback system, as claimed in claim 13, wherein a speed control servo loop is coupled to said drum motor for controlling the speed of said drum motor such that during playback, the data rate of one of said first and second playback signals will be higher than said first data rate and the data rate of the other of said first and second playback signals will be lower than said first data rate.

15. A magnetic playback system, as claimed in claim 9, wherein a speed control servo loop is coupled to said drum motor for controlling the speed of said drum rotor such that during playback, the data rate of one of said first and second playback signals will be higher than said first data rate and the data rate of the other of said first and second playback signals will be lower than said first data rate.

* * * * *